United States Patent
Lantz et al.

(10) Patent No.: US 7,971,203 B2
(45) Date of Patent: Jun. 28, 2011

(54) METHOD, APPARATUS AND SYSTEM FOR DYNAMICALLY REASSIGNING A PHYSICAL DEVICE FROM ONE VIRTUAL MACHINE TO ANOTHER

(75) Inventors: Philip R. Lantz, Cornelius, OR (US); Michael A. Goldsmith, Lake Oswego, OR (US); David J. Cowperthwaite, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1892 days.

(21) Appl. No.: 10/794,469

(22) Filed: Mar. 5, 2004

(65) Prior Publication Data
US 2005/0198632 A1    Sep. 8, 2005

(51) Int. Cl.
*G06F 9/46* (2006.01)
*G06F 9/455* (2006.01)

(52) U.S. Cl. .................................. 718/1; 711/6
(58) Field of Classification Search ........... 718/1; 711/6
See application file for complete search history.

(56) References Cited

U.S. PATENT DOCUMENTS

| | | | |
|---|---|---|---|
| 6,119,248 A * | 9/2000 | Merkin | 714/52 |
| 6,728,746 B1 * | 4/2004 | Murase et al. | 718/1 |
| 7,260,820 B1 * | 8/2007 | Waldspurger et al. | 718/1 |
| 2002/0013802 A1 | 1/2002 | Mori et al. | |
| 2002/0083110 A1 * | 6/2002 | Kozuch et al. | 709/1 |
| 2003/0212873 A1 | 11/2003 | Lee et al. | |
| 2003/0212884 A1 | 11/2003 | Lee et al. | |
| 2004/0143664 A1 * | 7/2004 | Usa et al. | 709/226 |
| 2004/0187106 A1 * | 9/2004 | Tanaka et al. | 718/1 |
| 2005/0076155 A1 * | 4/2005 | Lowell | 710/1 |
| 2005/0198632 A1 | 9/2005 | Lantz et al. | |
| 2006/0010450 A1 | 1/2006 | Culter | |
| 2006/0184938 A1 * | 8/2006 | Mangold | 718/1 |

FOREIGN PATENT DOCUMENTS

JP    2001265613 A  *  9/2001

\* cited by examiner

*Primary Examiner* — Kenneth Tang
(74) *Attorney, Agent, or Firm* — Barnes & Thornburg, LLP

(57) ABSTRACT

A method, apparatus and system enable a virtual machine manager ("VMM") to dynamically reassign physical devices from one virtual machine ("VM") to another. The VMM may generate a message to the VM that currently owns the physical device and inform the device that the physical device is shutting down. The current VM may thereafter idle the physical device, unload the device driver and eject the device. The VMM may then inform another VM that the physical device is available, and the second VM may load the driver for the device.

17 Claims, 4 Drawing Sheets

METHOD, APPARATUS AND SYSTEM FOR DYNAMICALLY REASSIGNING A PHYSICAL DEVICE FROM ONE VIRTUAL MACHINE TO ANOTHER

BACKGROUND

Interest in virtualization technology is growing steadily as processor technology advances. One aspect of virtualization technology enables a single host computer running a virtual machine monitor ("VMM") to present multiple abstractions and/or views of the host, such that the underlying hardware of the host appears as one or more independently operating virtual machines ("VMs"). Each VM may function as a self-contained platform, running its own operating system ("OS") and/or a software application(s). The VMM manages allocation of resources on the host and performs context switching as necessary to cycle between various virtual machines according to a round-robin or other predetermined scheme.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for dynamically reassigning a physical device from one virtual machine to another without having to reboot the operating systems on the virtual machine(s). Additionally, reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
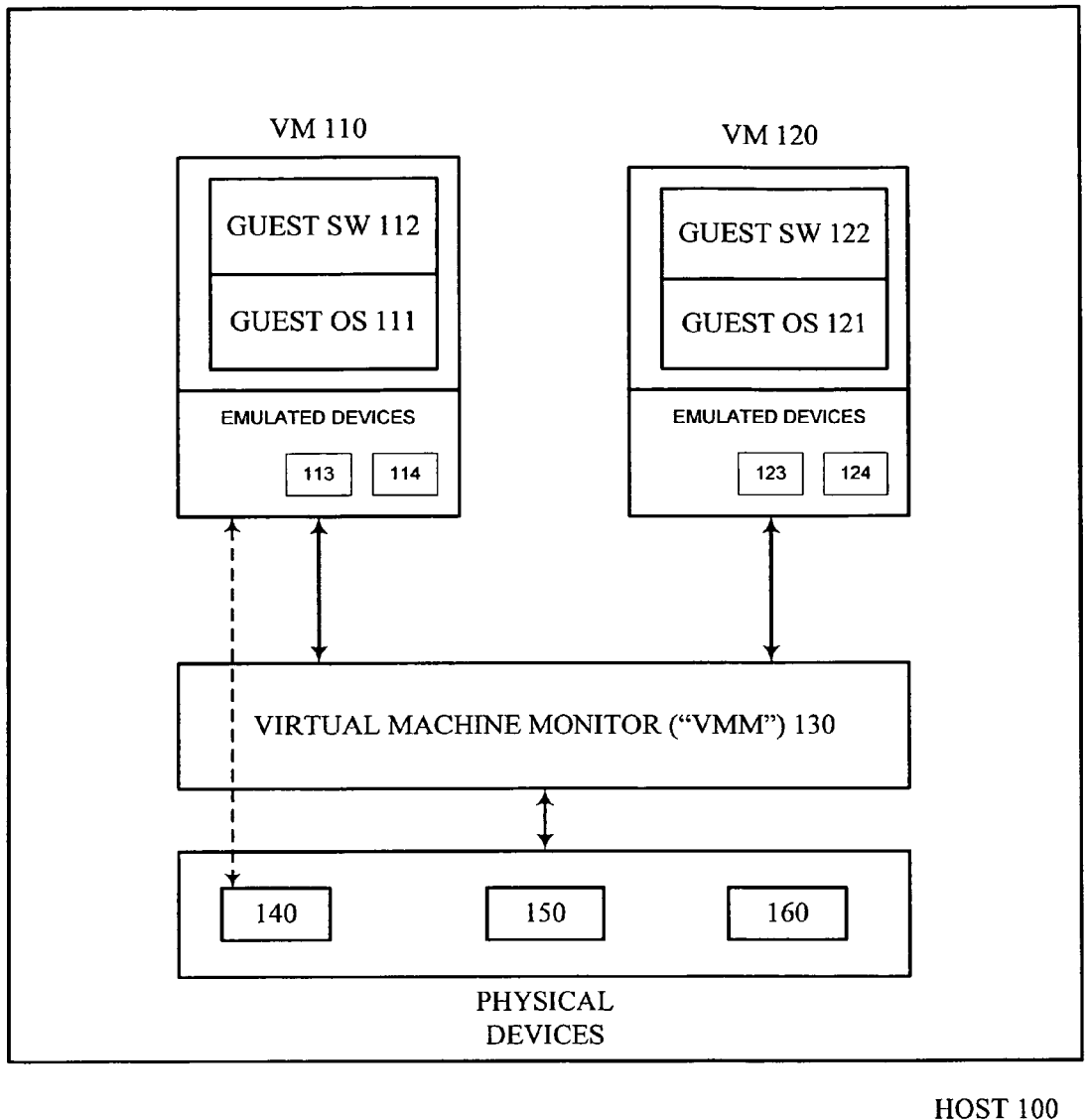
FIG. 1 illustrates an example of a typical virtual machine host.

FIG. 1 illustrates an example of a typical virtual machine host platform ("Host 100"). As previously described, a virtual-machine monitor ("VMM 130") typically runs on the host platform and presents an abstraction(s) and/or view(s) of the platform (also referred to as "virtual machines" or "VMs") to other software. Although only two VM partitions are illustrated ("VM 110" and "VM 120", hereafter referred to collectively as "Virtual Machines"), these Virtual Machines are merely illustrative and additional virtual machines may be added to the host. VMM 130 may be implemented in software (e.g., as a standalone program and/or a component of a host operating system), hardware, firmware and/or any combination thereof.

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software operates as if it were running on a dedicated computer rather than a virtual machine. That is, each Guest OS and/or Guest Software may expect to control various events and have access to hardware resources on Host 100. In reality, VMM 130 has ultimate control over the events and hardware resources and allocates resources to the Virtual Machines according to its own policies.

Various physical devices may be coupled to Host 100 (illustrated conceptually in FIG. 1 as Physical Devices 140, 150, and 160). Allocation of the physical devices to the various Virtual Machines is managed by VMM 130. VMM 130 may allocate these physical devices to the Virtual Machines by giving a specific Virtual Machine exclusive access to a device (e.g., Physical Device 140 to VM 110, as illustrated) and/or by creating and maintaining software instantiations of the devices (i.e., emulating the devices) for each of the Virtual Machines.

In the former situation, the device will not be available to the other Virtual Machines. If, on the other hand, a physical device on Host 100 is going to be shared by more than one Virtual Machine at the same time, VMM 130 typically emulates the physical device (i.e., implements an abstraction of the device for each Virtual Machine), and arbitrates access of the emulated devices to the physical device. In other words, VMM 130 may enable multiple emulated ("virtual") instantiations of the devices, thus allowing each Virtual Machine to seem to have direct access to some set of devices (illustrated conceptually in FIG. 1 as Emulated Device 113 and 114 on VM 110, corresponding to Physical Device 150 and 160, and Emulated Device 123 and 124 on VM 120, also corresponding to Physical Device 150 and 160). In reality, VMM 130 manages access to the physical devices according to some predetermined scheme such that the Guest OS and Guest Software in the Virtual Machines are unaware that they do not actually have direct access to and/or complete control of the physical devices.

In order to virtualize a physical device, VMM 130 may include software that emulates the behavior of the device ("device models"), thereby enabling the Guest OS and/or Guest Software in each Virtual Machine to load a corresponding device driver and make use of the device. Emulation software is well known to those of ordinary skill in the art and further description thereof is omitted herein in order not to unnecessarily obscure embodiments of the invention. VMM 130 may additionally include software to access the physical device (referred to as the "device driver"). This emulation approach may not, however, be practical in a variety of situations. For example, the interface between the operating system on the Virtual Machine and the physical device may be extremely complex for certain devices, and as a result, the device may be difficult, if not impossible, to model. A significant amount of software code may have to be added to VMM 130, and each new device may require additional code in VMM 130. Ultimately, this is likely to result in maintenance and stability problems for VMM 130. Additionally, emulating the devices may increase the overhead and noticeably decrease the performance of Host 100 and/or Physical Devices 140, 150 and 160. This performance degradation may be crucial for certain types of devices coupled to Host 100.

It is therefore apparent that there are situations in which giving a specific Virtual Machine exclusive access to a physical device may present a better alternative. As previously described, however, this solution results in only one Virtual Machine being able to access a physical device at any given time, i.e., the physical device is not available to other Virtual Machines on the host platform. Embodiments of the present invention enable the VMM on Host 100 to dynamically reassign physical devices to Virtual Machines as necessary, without having to reboot the operating systems on the Virtual Machines. More specifically, the VMM on Host 100 may cause a Virtual Machine to behave as if a device dedicated to it is going to be physically shutdown and/or removed. This prompts the Guest OS and/or Guest Software in the Virtual Machine to take appropriate steps to unload the device driver associated with the physical device and as a result, releases the physical device to be used by another Virtual Machine.

Figure 2:
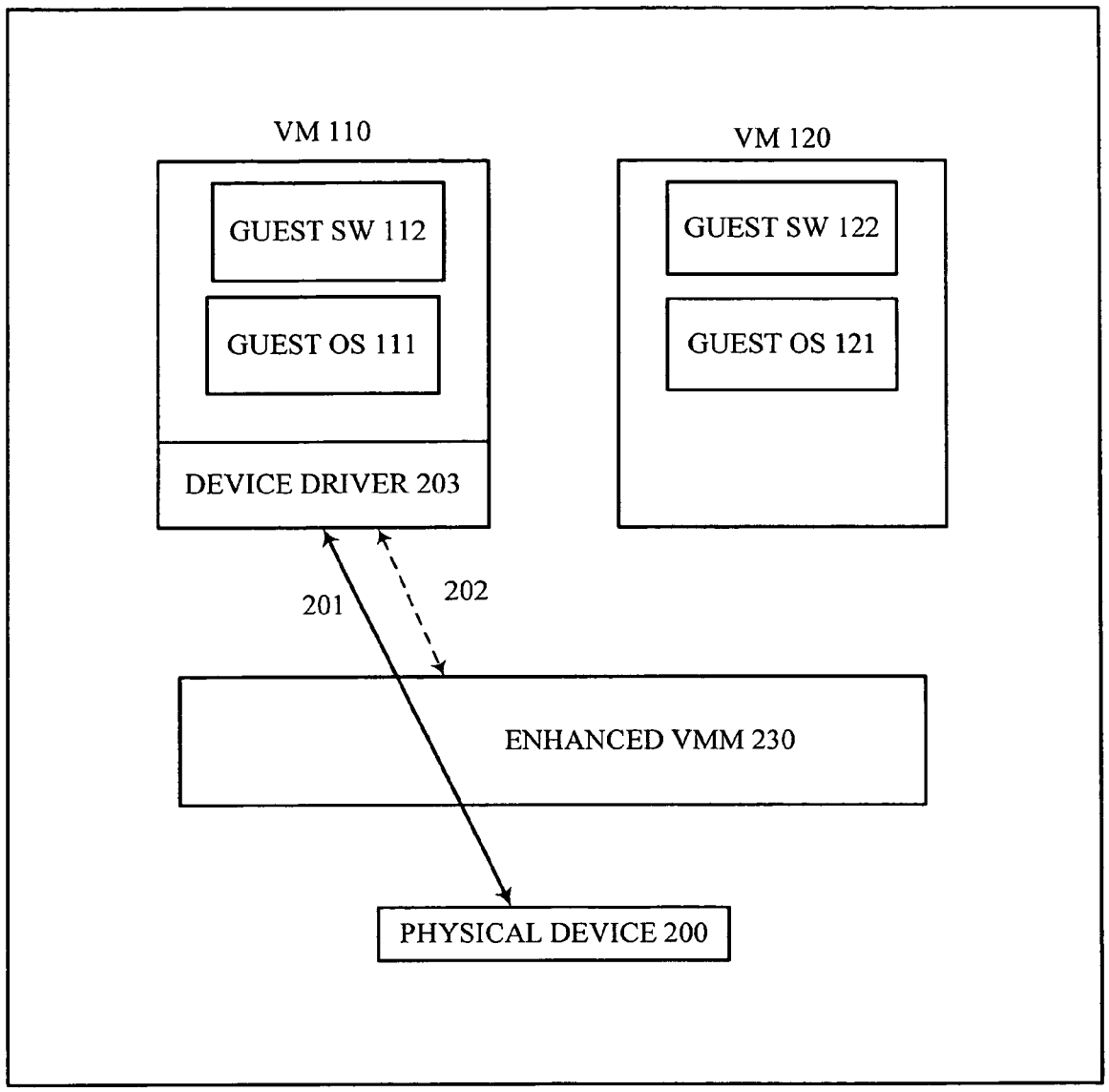
FIG. 2 illustrates an overview of ejecting a device according to one embodiment of the present invention.
Figure 3:
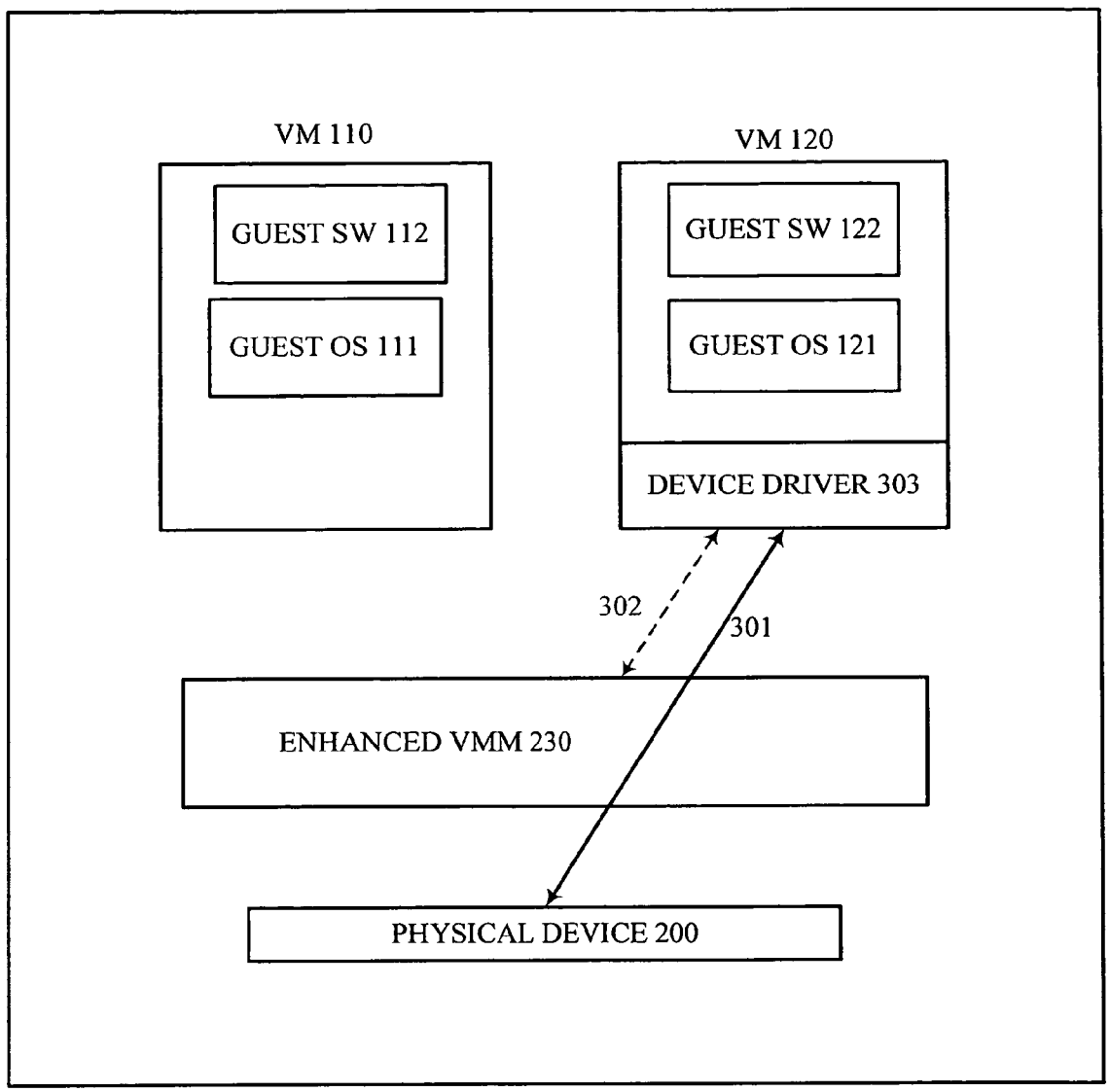
FIG. 3 illustrates an overview of assigning the ejected device in FIG. 2 to a new VM according to one embodiment of the present invention.

FIG. 2 and FIG. 3 illustrate an embodiment of the present invention in further detail, wherein a physical device is dynamically reassigned from VM 110 to VM 120. As illustrated in FIG. 2, Physical Device 200 may initially be assigned to VM 110, i.e., it may be directly accessible by VM 110 via 201. The term "Enhanced VMM 230" shall include a VMM enhanced to enable various embodiments of the present invention as described herein. It will be readily apparent to those of ordinary skill in the art that the enhancements may be made to an existing VMM and/or to other elements that may work in conjunction with the VMM. Enhanced VMM 230 may therefore be implemented in software (e.g., as a standalone program and/or a component of a host operating system), hardware, firmware and/or any combination thereof.

According to one embodiment of the present invention, a user action may cause Enhanced VMM to dynamically reassign Physical Device 200 from VM 110 to VM 120. In an alternate embodiment, Enhanced VMM 230 may dynamically reassign Physical Host Device 200 based on a predetermined assignment scheme. In order to accomplish the dynamic reassignment, Enhanced VMM 230 may cause VM 110 to release the device by simulating a shutdown and/or removal of Physical Device 200. Specifically, Enhanced VMM 230 may generate a message to VM 110 that causes VM 110 to believe that the device is being shutdown. Any reference herein to "shutting down" the device shall include shutting down and/or removing the device. The interactions between Enhanced VMM 230 and VM 110 are represented by 202 in FIG. 2.

In one embodiment, the message that Enhanced VMM 230 generates may be an Advanced Configuration & Power Interface ("ACPI") General Purpose Event ("GPE") to VM 110. ACPI (e.g., Revision 2.0b, Oct. 11, 2002) is an open industry standard specification for a power management scheme. The ACPI event generated by Enhanced VMM 230 may be emulated in software, rather than being generated and/or handled by Host 100's hardware. ACPI and GPEs are well known to those of ordinary skill in the art and further description thereof is omitted herein in order not to unnecessarily obscure embodiments of the present invention. Additionally, although the description herein uses the Advanced Configuration & Power Interface ("ACPI") as an example, other interfaces and/or protocols may be used to achieve the same effect without departing from the spirit of embodiments of the present invention.

Upon receipt of the GPE, Guest OS 111 in VM 110 may read the ACPI event status register and/or perform other operations (e.g., make inquiries pertaining to configuration registers in the host bus (hereafter "configuration inquiries") to determine the purpose of the GPE. Enhanced VMM 130 may intercept these operations and inform VM 110 that Physical Device 200 is being shutdown. As a result, although Physical Device 200 may not be physically shutting down, it will appear so to VM 110. Upon receipt of this information, Guest OS 111 may idle the device, i.e., stop issuing commands to the device and cancel any pending or ongoing work. Guest OS 111 may also unload the device driver corresponding to Physical Device 200 (illustrated as "Device Driver 203") and "eject" the device (i.e., Guest OS 111 may send a message to Physical Device 200 to inform the device that it may be disconnected). Since Physical Device 200 is not in fact being shutdown, Enhanced VMM 230 may intercept the message from VM 110 to Physical Device 200. Physical Device 200 may thereafter be available to another Virtual Machine.

Now, Enhanced VMM 230 may reassign Physical Device 200 to another Virtual Machine on Host 100, e.g., VM 120 (illustrated in FIG. 3). Specifically, in one embodiment, Enhanced VMM 230 may again generate an emulated ACPI GPE, this time to VM 120. Guest OS 121 in VM 120 may read the ACPI event status register and/or perform other operations to determine the reason for the GPE. Again, Enhanced VMM 230 may intercept these operations and inform VM 120 that Physical Host Device 200 is available. Upon receipt of this information, Guest OS 121 may load Device Driver 303 and VM 120 may thereafter have exclusive access to Physical Device 200 via 301 until such time as the device is requested by another Virtual Machine and/or Enhanced VMM 230 decides to reassign Physical Device 200. The mechanism by which Enhanced VMM 230 transfers access to Physical Device 200 from VM 110 to VM 120 may differ depending on the type of device and the physical/electrical means by which the device is connected. Thus, for example, if Physical Device 200 is a Peripheral Component Interconnect ("PCI") compatible device, the actual transfer of the device from one Virtual Machine to another may include configuration inquiries such as querying the configuration registers on the PCI bus to detect the device, determine the type of device and/or configure the device to enable communication with a software device driver. In other embodiments, Physical Device 200 may be compatible with other bus standards including various versions of Universal Serial Bus ("USB") (e.g., USB Implementers Forum, USB Version 2.0, 2001), FireWire (e.g., Institute of Electrical and Electronics Engineers ("IEEE") 1394, 1995-2002), PCI Express (e.g., PCI Special Interest Group "SIG", Revision 1.0, Jul. 22, 2002), and other such existing and future standards.

Figure 4:
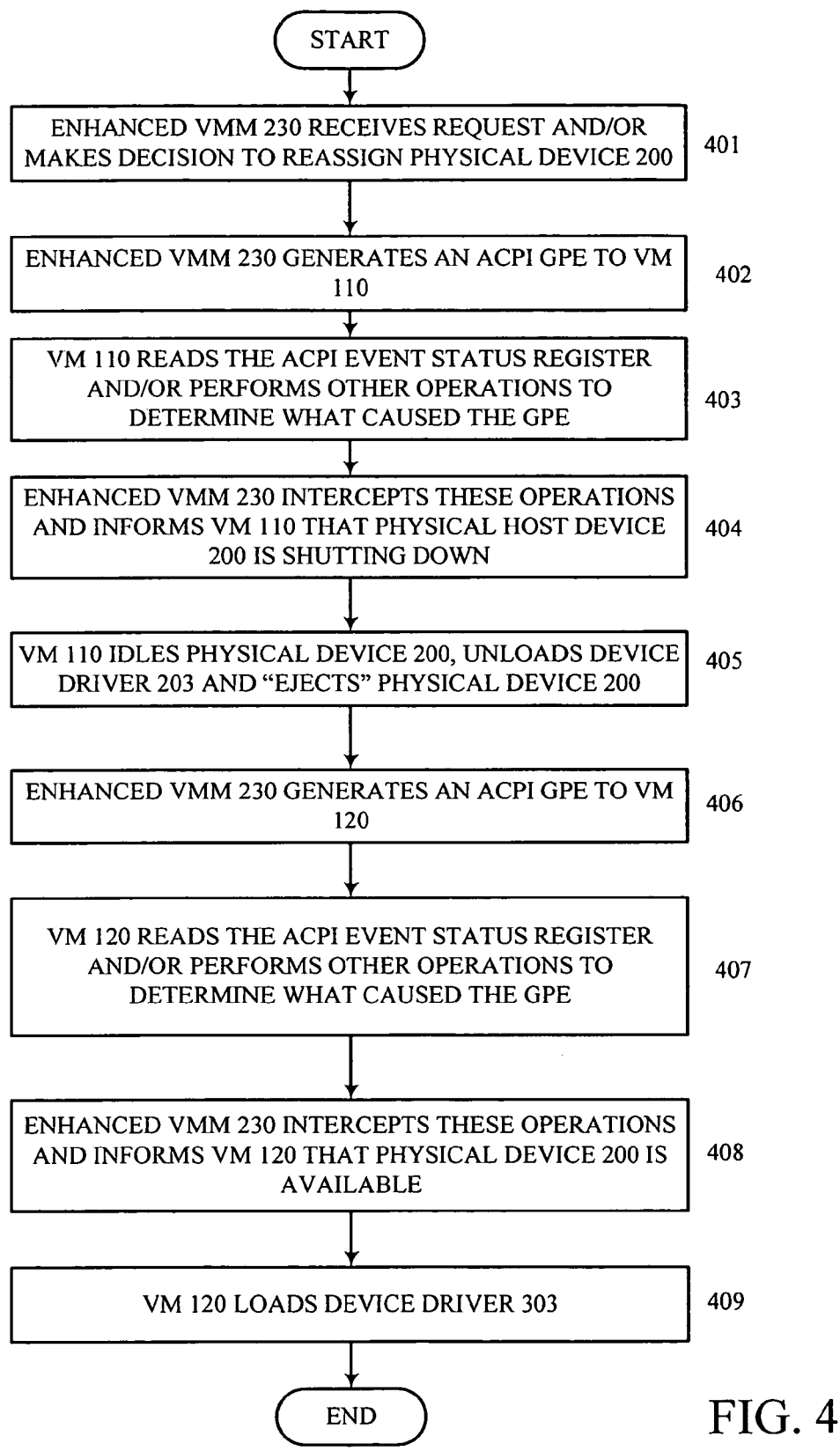
FIG. 4 is a flowchart illustrating an embodiment of the present invention.

Embodiments of the present invention thus enable Enhanced VMM 230 to dynamically reassign physical devices while avoiding the need to have to reboot Guest OS 111 and Guest OS 121. This flexibility becomes increasingly valuable as more and more physical devices are coupled to Host 100. FIG. 4 is a flow chart illustrating an overview of an embodiment of the present invention. Although the following operations may be described as a sequential process, many of the operations may in fact be performed in parallel and/or concurrently. In addition, the order of the operations may be re-arranged without departing from the spirit of embodiments of the invention. In 401, Enhanced VMM 230 receives a request and/or makes the decision to reassign Physical Device 200. Enhanced VMM 230 may in 402 generate an ACPI GPE to VM 110 that currently has Physical Device 200 dedicated to it. As previously discussed, although embodiments of the invention are described herein with respect to ACPI, other interfaces and/or protocols may be used to achieve the same effect without departing from the spirit of embodiments of the invention. In 403, Guest OS 111 in VM 110 may read the ACPI event status register and/or perform other operations to determine the cause of the GPE. These operations may be intercepted by Enhanced VMM 230 in 404, and Enhanced VMM 230 may inform VM 110 that Physical Device 200 is shutting down. Guest OS 111 may thereafter in 405 idle Physical Device 200, unload Device Driver 203 and eject the device. In 406, Enhanced VMM 230 may send a second ACPI GPE to VM 120. In 407, Guest OS 121 in VM 120 may read the ACPI event status register and/or perform other operations to determine the cause of the GPE. In 408, these operations may be intercepted by Enhanced VMM 230, and Enhanced VMM 230 may inform VM 120 that Physical Device 200 is available. Guest OS 120 may thereafter in 409 load Device Driver 303 and VM 120 may then have exclusive access to Physical Host Device 200.

Although the above description focuses on hosts running multiple Virtual Machines, embodiments of the present invention are not so limited. Instead, embodiments of the invention may be implemented on any platforms with multiple independent computer systems (virtual or otherwise) that share a bus. Thus, for example, in a server system having independent computer systems, one of the computer systems may be used as a backup system for failures. Upon the failure of the main computer system, embodiments of the present invention may be utilized by a monitoring and/or management component to dynamically reassign all physical devices to the backup computer system, thus enabling the server system to continue running without having to reboot any operating systems. Various other types of systems may also benefit from other embodiments of the present invention.

The hosts according to embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores and/or transmits information in any form accessible by a computing device, the machine-accessible medium including but not limited to, recordable/non-recordable media (such as read-only memory (ROM), random-access memory (RAM), magnetic disk storage media, optical storage media and flash memory devices).

According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for dynamically reassigning a physical device from a first virtual machine ("VM") to a second VM, comprising:
   generating a first message on behalf of the physical device to the first VM, the first message based on an Advanced Configuration and Power Interface ("ACPI") protocol and causes the first VM to believe that the physical device is being shutdown;
   intercepting a first inquiry from the first VM regarding a cause of the first message;
   informing the first VM in response to the first inquiry that the physical device assigned to the first VM is being shutdown;
   intercepting a shutdown instruction from the first VM to the physical device such that the shutdown instruction is not received by the physical device;
   assigning the physical device to the second VM;
   generating a second message to the second VM based on the ACPI protocol;
   intercepting a second inquiry from the second VM regarding a cause of the second message; and
   informing the second VM in response to the second inquiry that the physical device is available.

2. The method according to claim 1 further comprising causing the first VM to issue another instruction to eject the physical device.

3. The method according to claim 1 wherein notifying informing the second VM in response to the second inquiry that the physical device is available further comprises notifying the second VM according to ACPI protocol.

4. The method according to claim 1 further comprising intercepting configuration inquiries issued by the second VM.

5. The method according to claim 1 further comprising receiving a user request to reassign the physical device from the first VM to the second VM.

6. The method according to claim 1 wherein reassigning the physical device from the first VM to the second VM is based on a predetermined assignment policy.

7. A method of dynamically reassigning a physical device from a first computer system to a second computer system, comprising:
   generating a first message on behalf of the physical device to the first computer system according to an Advanced Configuration and Power Interface ("ACPI") protocol to cause the first computer system to believe that the physical device is being removed;
   intercepting a first inquiry from the first computer system pertaining to a cause of the first message;
   informing the first computer system in response to the first inquiry that the physical device is being shutdown;
   generating a second message to the second computer system based on the ACPI protocol;
   intercepting a second inquiry from the second computer system pertaining to a cause of the second message; and
   informing the second computer system in response to the second inquiry that that the physical device is available.

8. The method according to claim 7 further comprising causing the first computer system to issue another instruction to eject the physical device.

9. The method according to claim 7 further comprising intercepting configuration inquiries issued by the second computer system.

10. The method according to claim 7 further comprising receiving a user request to reassign the physical device from the first computer system to the second computer system.

11. The method according to claim 7 wherein reassigning the physical device from the first computer system to the second computer system is based on a predetermined assignment policy.

12. The method according to claim 7, further comprising:
detecting a failure in the first computer system;
initiating reassignment of the physical device from the first computer system to the second computer system; and
wherein generating the first message on behalf of the physical device to the first computer system further comprises generating the first message in response to detecting the failure in the first computer system.

13. A host computer system for dynamically reassigning physical devices, comprising:
a monitoring module;
a first computer system coupled to the monitoring module;
a second computer system coupled to the monitoring module; and
a physical device coupled to the monitoring module, the monitoring module dynamically reassigning the physical device from the first computer system to the second computer system by:
generating a first message from the monitoring module to the first computer system according to an Advanced Configuration and Power Interface ("ACPI") protocol, the first message causes the first computer system to believe that the physical device is being removed,
intercepting a first inquiry issued by the first computer system regarding a cause of the first message in response to receiving the first message from the monitoring module,
informing the first computer system in response to the first inquiry that the physical device is being shutdown,
intercepting a shutdown instruction from the first computer system to the physical device such that the shutdown instruction is not received by the physical device,
generating a second message from the monitoring module to the second computer system based on the ACPI protocol,
intercepting a second inquiry issued by the second computer system regarding a cause of the second message in response to receiving the second message from the monitoring module, and
informing the second computer system in response to the second inquiry that the physical device is available.

14. The system according to claim 13 wherein the monitoring module further assigns the physical device to the second computer system.

15. The system according to claim 13 wherein the first computer system and the second computer system are virtual machines ("VM") on the host computer.

16. A non-transitory machine-accessible medium having stored thereon instructions that, when executed by a machine, cause the machine to dynamically reassign a physical device from a first virtual machine ("VM") to a second VM by:
generating a first message to the first VM on behalf of the physical device based on an Advanced Configuration and Power Interface ("ACPI") protocol, the first message causing the first VM to believe that the physical device is being shutdown;
intercepting a first inquiry from the first VM regarding a cause of the first message;
informing the first VM in response to the first inquiry that the physical device assigned to the first VM is being shutdown;
intercepting a shutdown instruction from the first VM to the physical device such that the shutdown instruction is not received by the physical device;
assigning the physical device to the second VM;
generating a second message to the second VM based on the ACPI protocol;
intercepting a second inquiry from the second VM regarding a cause of the second message; and
informing the second VM in response to the second inquiry that the physical device is available.

17. The non-transitory machine-accessible medium according to claim 16 wherein the instructions, when executed by the machine, further cause the machine to cause the first VM to issue another instruction to eject the physical device.

* * * * *